United States Patent [19]
Blomquist

[11] Patent Number: 5,882,511
[45] Date of Patent: Mar. 16, 1999

[54] FILTER APPARATUS WITH COUPLING AND LATCH MECHANISM

[75] Inventor: Robert J. Blomquist, Perryville, Md.

[73] Assignee: Fil-Tech Corporation, Md.

[21] Appl. No.: 739,590

[22] Filed: Oct. 30, 1996

[51] Int. Cl.[6] .......................... B01D 27/00; B01D 29/62; B01D 35/027; B01D 35/02
[52] U.S. Cl. .......................... 210/167; 210/232; 210/238; 210/323.1; 210/340; 165/119; 285/316; 285/921
[58] Field of Search ...................... 210/232, 238, 210/323.1, 340, 167; 55/356, 490; 285/305, 308, 316, 921; 165/119

[56] References Cited

U.S. PATENT DOCUMENTS

| | | |
|---|---|---|
| 3,399,776 | 9/1968 | Kuvth . |
| 3,646,964 | 3/1972 | Stratman . |
| 4,655,482 | 4/1987 | Myers . |
| 5,192,427 | 3/1993 | Eger . |
| 5,423,984 | 6/1995 | Belden . |
| 5,611,923 | 3/1997 | Suri . |

OTHER PUBLICATIONS

Foster Manufacturing Co. : General catalog of Gupling, hosa fittings, Valves, and Blow guns. 1994 date.

Primary Examiner—Thomas M. Lithgow
Attorney, Agent, or Firm—Huntley & Associates

[57] ABSTRACT

A filter system providing an improved connection device providing quicker and easier removal and installation of filters and increased reliability of the filters due to the improved connection device.

16 Claims, 5 Drawing Sheets

FILTER APPARATUS WITH COUPLING AND LATCH MECHANISM

BACKGROUND OF THE INVENTION

This invention relates generally to filters and particularly to filter systems for use in purifying fluids used in power generation plants. Fluids are used as coolants and to generate steam from the heat of the power generating reaction taking place in the power plant. Water is commonly used as a fluid in such power generation plants. Generally, to optimize the efficiency and performance of the application utilizing the water or other fluid, it should be purified, and filtering is a common means of purification.

Purification is typically completed in a system such as a large filter vessel containing multiple filters. This stage of purification is important, because any minerals or other impurities present in the water can foul the power plant by bonding to metal or concrete surfaces, reducing the efficiency of the plant and eventually causing damage that may require repair. Accordingly, the removal of impurities can directly affect the efficiency of the plant, and can assist in avoiding down time due to repair or cleaning. For example, if the water will be used to cool a reactor and generate electricity as it is passed through a steam driven turbine, it is important to remove any impurities within the water to prevent them from fouling the system and decreasing its efficiency. Minerals within the water may bond with the water conduit as it is subjected to heat, thus restricting the flow of water.

A typical purification system involves a large filter or demineralizer comprising a multitude of individual filters through which the coolant is passed. Previous methods of incorporating individual filters into a purification system have failed to address the problem of individual filters becoming detached from their connections within the purification system, thus allowing impurities to enter the power plant, and eventually causing the power plant to be shut down pending the reconnection of the filters. These filters are often connected with hook and guide rods which require a great deal of force to latch the spring loaded hook and guide rod and align a pin with a cam surface, locking the filter in place. The hook and guide rod design presently used is susceptible to malfunction due to incomplete engagement between the pin and the cam surface, differences in the spring strength and length, and the force of the fluid passing through the filter.

Maintaining the filters within a purification system is also important to the continued efficient operation of a power plant. Typical maintenance involves reconnecting filters which have become disconnected or have been forced from their connection by the pressure of the fluid passing through them, and requires the purification system to be temporarily shut down during reconnection. Because of the proximity of each filter within the purification system, it is difficult and time consuming to reconnect presently used filters.

In addition to the importance of quickly and easily connecting the filters, and of maintaining that connection, it is important to be able to recover used filters by backwashing fluid through them to remove the impurities that have been filtered out. After continued use, the filter will become filled with particles, and the filter will become unable to purify fluid. To prolong the life of the individual filters and delay their replacement, the flow of fluid within the purification system can be reversed to backwash the filters and remove the debris collected by the filters. However, by reversing the flow of fluid through the purification system, the filters are subjected to a force directed in the opposite direction of the force of filtering. This reverse force can negatively affect the individual filters, forcing them from their connections and requiring the system to be shut down until the filters are reconnected.

Individual filters can also be treated to attract ions that may not be captured by the physical structure of the filter. Backwashing is also important to remove filter treatments saturated with attracted impurities.

For the reasons described above, the presently used filters are susceptible to a variety of malfunctions due to becoming disconnected during backwashing, installation error, and defects or variations in the connecting mechanism. Accordingly, there is an unmet need for a more reliable means of attaching and securing a filter cartridge within a filter system, so that the filter cartridge will not be affected by increased pressure or the reversal of fluid flow associated with backwashing or cleaning of the purification system. In addition, due to the number of filters within a purification system, there is an unmet need for an improved coupling mechanism providing an easy and efficient means of attaching or removing a filter from the system, thus providing a means of reducing downtime in the apparatus utilizing the present filter system. Finally, there is a need for a filter system incorporating an improved filter element having improved filtration capacity due to the improved coupling mechanism.

SUMMARY OF THE INVENTION

The present invention provides a filter system having improved filtration capacity and increased reliability. The present invention also provides an improved mechanism for connecting and disconnecting the filter from the purification system, the mechanism providing an improved means of quickly and easily replacing the filters and increased attachment reliability.

Specifically, the present invention provides a filter system adapted to purify fluid comprising: a first conduit segment, a second conduit segment, and a filter cartridge, each segment having reciprocal mating ends and mating means adapted to connect the segments; the first conduit segment having a connecting end and a female mating end, the connecting end adapted to connect to a conduit conveying fluid to or from a filter system, the female mating end further comprising mating means and a coupling collar assembly, the coupling collar assembly being movable at least between extended and retracted positions, the collar assembly adapted to expose the female mating end and open the mating means when in the retracted position, and to cover the female mating end and close the mating means when in the extended position; the second conduit segment having a connecting end and a male mating end, the connecting end adapted to connect to the filter cartridge, and the male mating end further comprising mating means; wherein the male mating end is adapted to be inserted into the female mating end, thus connecting each conduit segment to form a single conduit, and the mating means of each segment are adapted to further connect each segment in the mated position, and wherein the collar assembly is adapted to secure the segments together when it is in the extended position, and wherein the segments can be separated when the collar assembly is in the retracted position.

DETAILED DESCRIPTION OF THE INVENTION

Figure 1:
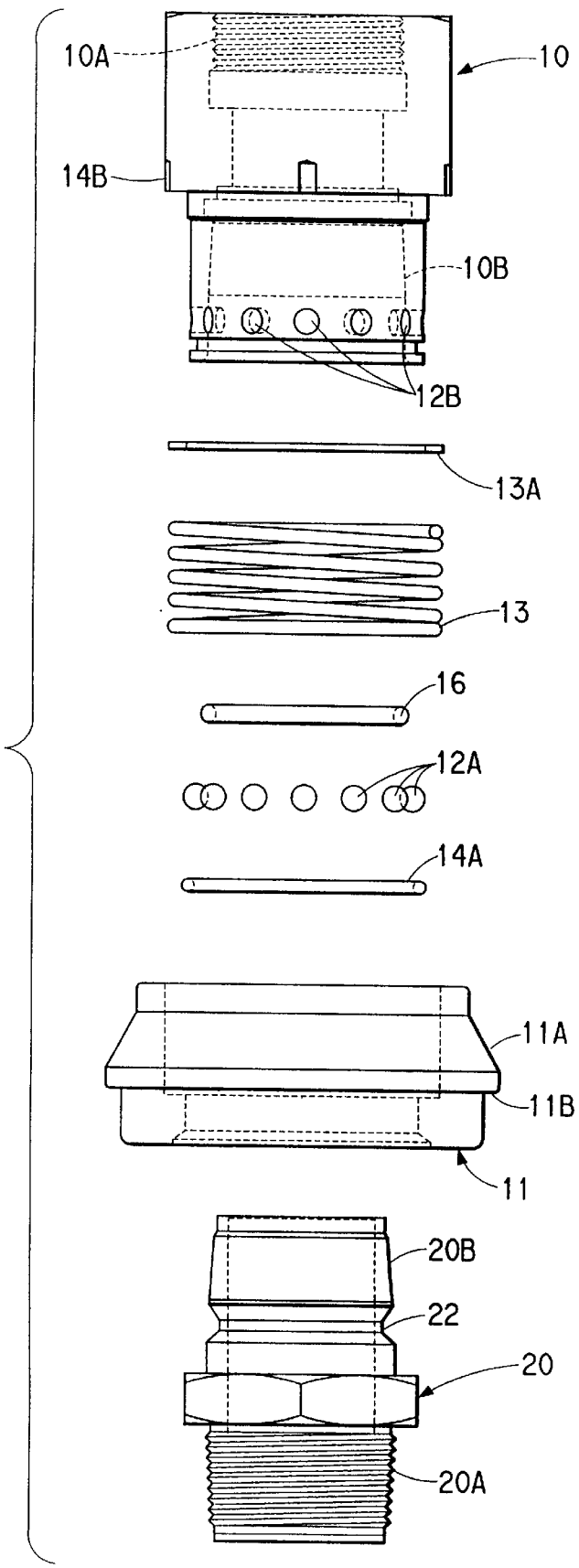
FIG. 1 is an exploded view of one embodiment of a first conduit segment of the present invention and its associated components, and one embodiment of a second conduit segment of the present invention.
Figure 2:
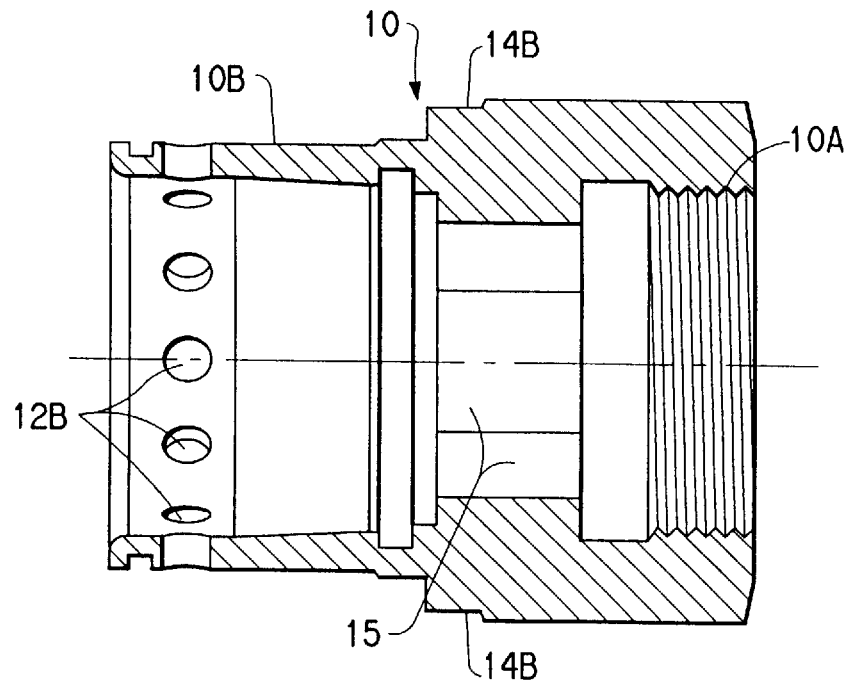
FIG. 2 is a cross sectional view of a first conduit segment of the invention without its associated components.
Figure 3:
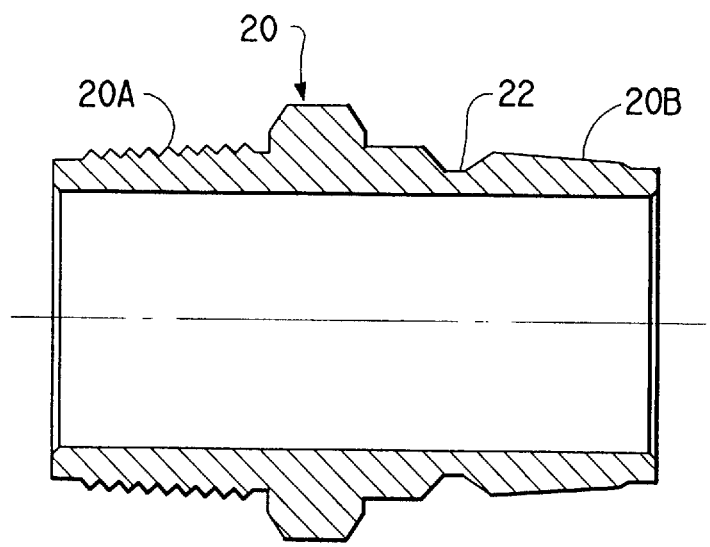
FIG. 3 is a cross sectional view of a second conduit segment of the invention.
Figure 4:
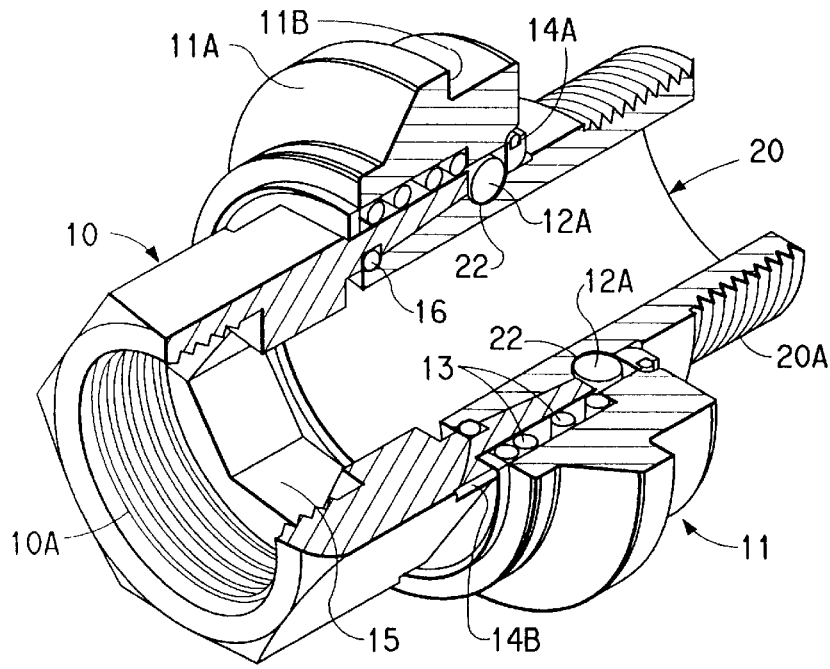
FIG. 4 is a perspective view of the conduit segments of FIG. 1 joined together in the mated position, both conduit segments being partially cut away.
Figure 5:
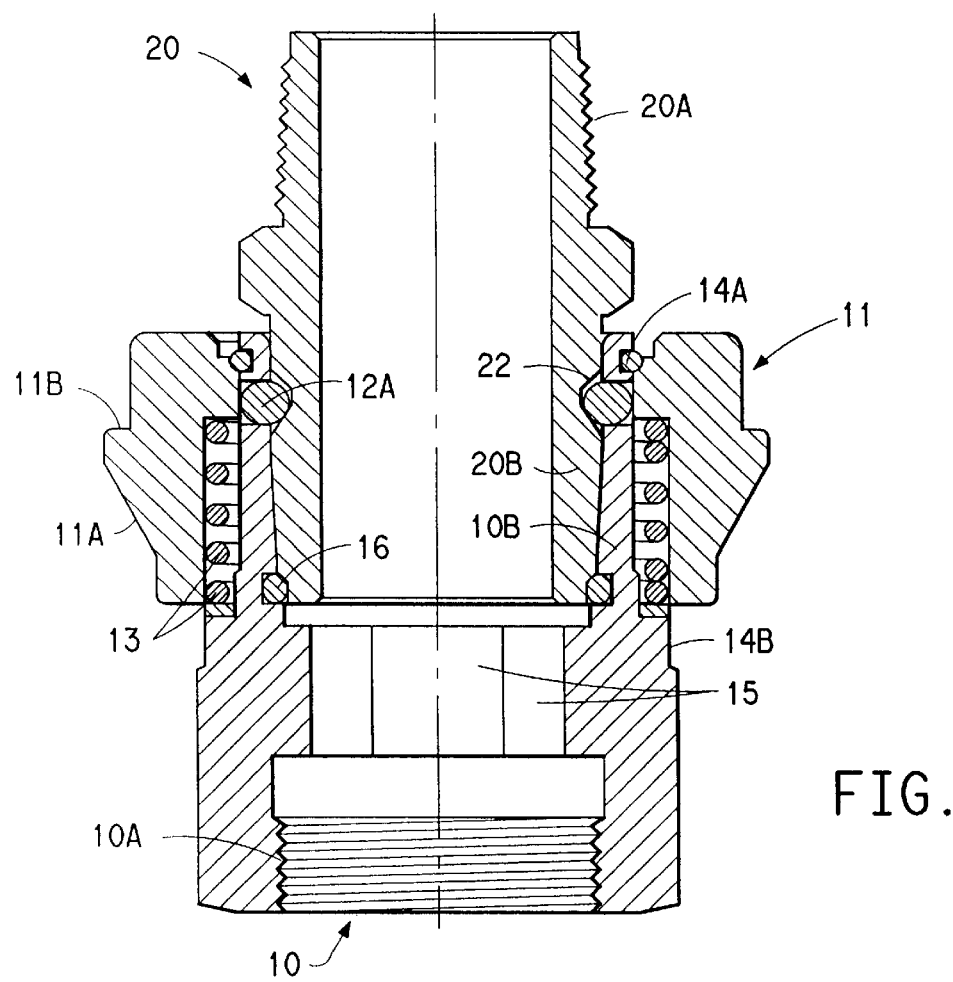
FIG. 5 is a cross sectional view of FIG. 4.

The present invention will be more fully understood by reference to the drawings, which show one embodiment of a filter system of the present invention. Variations and modifications of this embodiment can be substituted without departing from the principles of the invention, as will be evident to those skilled in the art. In the several drawings, the same numbers are used for like elements.

In the Figures, one embodiment of a filter system of the present invention comprises a first conduit segment 10, a second conduit segment 20, and a filter cartridge 30.

The first conduit segment has a connecting end 10A adapted to connect to a conduit, not shown, conveying fluid, and a female end 10B having mating means 12 adapted to mate with the second conduit segment 20. The conduit can convey fluid to or from a filter system, depending on the application. The connecting end of the first conduit segment is attached to the conduit and thus can receive fluid for backwashing the filter, or it can convey filtered fluid. In the embodiment shown, the connecting end of the first conduit segment is threaded and thus adapted to be connected to a threaded conduit. Typically, the first conduit segment is not removed from the conduit once it has been connected.

Preferably, the first conduit segment further comprises torsion receiving means 15, which provide a convenient means of connecting and tightening the first conduit segment to the conduit. In the embodiment shown, the torsion receiving means comprises planar surfaces along the interior surface of the first conduit segment arranged to form a hexagonal configuration. This internal hexagonal configuration is located in the middle of the first conduit segment, between the connecting end and the female end. The hexagonal configuration is adapted to accept an appropriately sized hex wrench, and thus adapted to be torqued by that wrench in the direction necessary to remove the conduit segment or connect it. Other torsion receiving means include an internal torsion wrench configuration. The torsion means thus provides an improved method of attaching the first conduit segment to a conduit segment conveying fluid to or from the purification system. Previous methods of attachment included force receiving means on the exterior surface of the conduit segment, but due to the close proximity of the conduit segments within the purification system, it is difficult to maneuver a wrench or other tool, and thus an internal system offers an improved means of attaching and replacing the segments. Accordingly, the present invention provides an improved means of connecting and disconnecting conduit segments that is unaffected by the proximity of other filter systems within the purification system.

Figure 6:
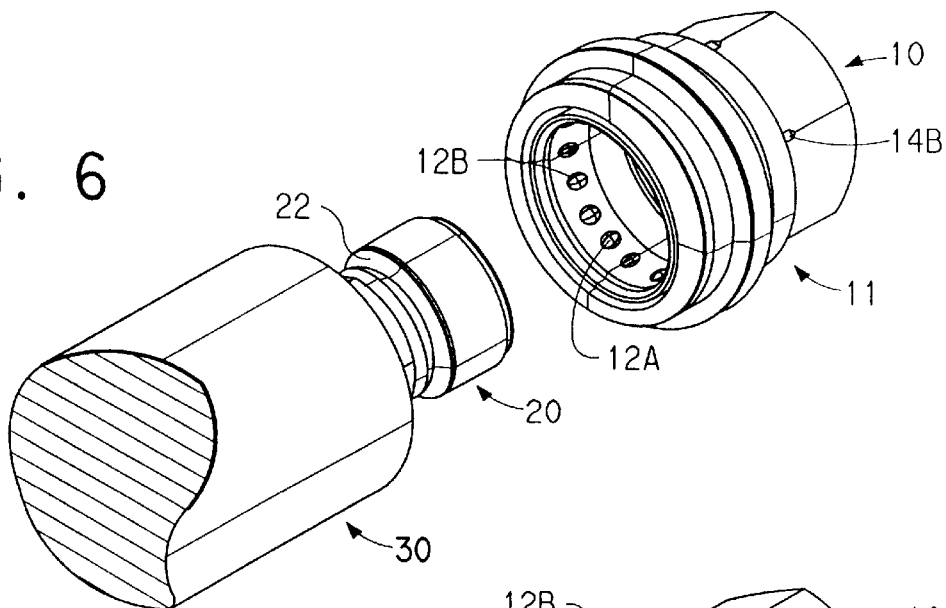
FIG. 6 is a perspective view of a second conduit segment with attached filter cartridge and a first conduit segment with the collar in the extended position.
Figure 7:
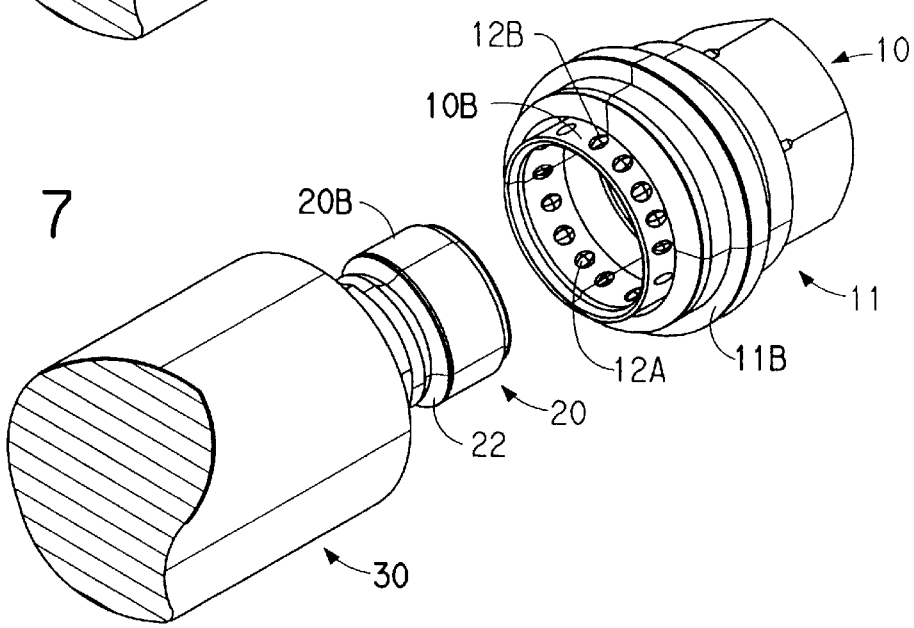
FIG. 7 is a perspective view of a second conduit segment with attached filter cartridge and a first conduit segment with the collar in the retracted position showing the mating means of the first conduit segment.
Figure 8:
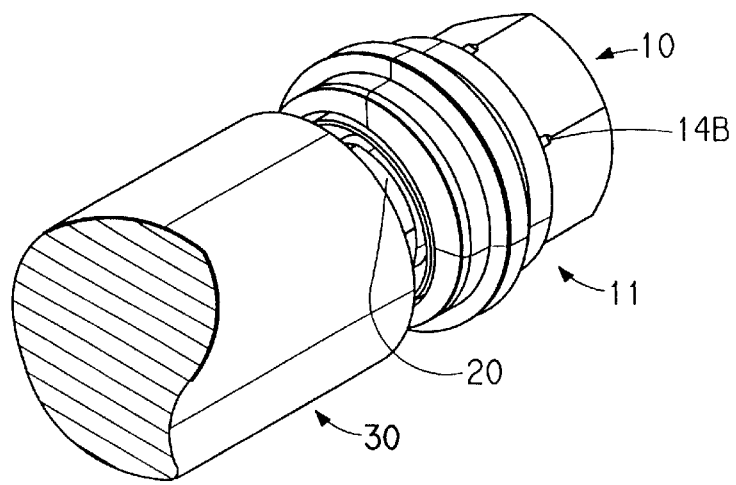
FIG. 8 is a perspective view of a first conduit segment mated to a second conduit segment with attached filter cartridge.

The first conduit segment further comprises a movable coupling collar 11. The collar is movable between at least the extended and retracted positions, and is shown in the extended position in FIG. 6 and in the retracted position in FIG. 7. In the embodiment shown, the collar is biased towards the extended position by a collar spring 13. The collar spring is retained in place by a washer 13A. The first conduit segment further comprises upper 14A and lower 14B restraining means to restrict the movement of the collar between the extended and retracted positions, and to retain the collar and collar spring in relation to the first conduit segment. When the collar is in the retracted position it is in contact with the lower restraining means, and when the collar is in the extended position, it is in contact with the upper restraining means. The upper restraining means 14A is shown as a retaining ring at the end of the female mating end of the first conduit segment. This ring extends the width of the female mating end beyond the internal dimensions of the collar, thus preventing the collar from moving beyond the ring. The lower restraining means 14B shown comprise notches cut into the exterior of the first conduit segment. The notches have terminal ends which contact the collar when the collar is in the retracted position, thus preventing the collar from moving beyond the retracted position. The collar, which fits around the first conduit segment, is thus retained between the extended and retracted positions.

The first conduit segment preferably contains sealing means 16, which are shown in the figures as an O-ring positioned within the female mating end, adapted to form a tighter seal with the male mating end of the second conduit segment, discussed below.

Preferably, the collar extends around the first conduit segment and has a wider profile than the first segment, as well as having a wider profile than the filter cartridge. The advantage of the wide profile collar relates to the ease of moving such a collar, and more specifically, to the latch/delatch tool 40 described below. In the embodiment of the collar shown, the wide profile collar comprises an angular flange 11A which forms a lip 11B, the flange and lip extending around the perimeter of the collar.

When the collar is in the retracted position, the female end of the first conduit segment is exposed, and the mating means 12 of the female end is open, and thus the first conduit segment is adapted to receive and mate with the second conduit segment. The mating means 12 of the female end shown comprise a multiplicity of spheres 12A arranged in apertures 12B in the first conduit segment. The spheres are slightly larger than the apertures, and are positioned within the apertures between the exterior of the first conduit segment and the interior of the collar. The spheres are thus retained within their respective apertures by the collar. When the collar is in the extended position, the spheres are forced inwardly, extending beyond the interior walls of the first conduit segment. When the spheres are forced inwardly, the mating means are closed. When the collar is in the retracted position, the spheres are free to move towards the collar, no longer forced inwardly by the collar, and are thus in the open position. The apertures are preferably configured so that when the collar is in the retracted position, the spheres will be drawn outwardly, towards the collar, by gravity.

The second conduit segment 20 has a connecting end 20A adapted to connect to a filter cartridge 30, and a male end 20B having mating means 22 adapted to mate with the mating means 12 of the female end 10B of the first conduit segment 10. In the embodiment shown, the connecting end of the second conduit segment is threaded to connect with a threaded end of a filter cartridge. The second conduit segment's mating means 22 shown comprises a channel cut into the male end of the second conduit segment. The channel is a radial groove positioned to interact with the mating means of the first conduit segment when the two segments are joined together in the mated position. With the two sections joined together, the channel is positioned inside the spheres of the first segment, and the collar, when in the extended position, forces a portion of the spheres into the channel, thus securing the segments together.

The female end of the first segment is also adapted to receive the male end of the second segment and mate with it, and the collar will secure the segments in the mated position, as shown in FIGS. 4, 5, 8, & 10. When the collar is in the extended position, the female end of the first segment is covered, and the mating means of the first segment is closed. If the first and second conduit segments are in the mated position and the collar is extended, the male end and mating means of the second segment will be locked together with the female end and mating means of the first conduit segment, and the two segments will thus be connected to form a single conduit segment attached at one end to a conduit conveying fluid, and at the other end to a filter cartridge 30. Alternatively, when the collar is in the extended position, unmated segments will be prevented from mating and the mating means will be closed.

The specific filter cartridge used can vary widely, however, the filter cartridge shown is a 10 micron type approximately 70 inches long, constructed of seven 10 inch melt welded sections comprising pleated, melt blown polypropylene filter membrane arranged around a nonmetallic filter core. Similar filter cartridges called Hydroguard Filters are commercially available from Memtec Corporation. In a preferred embodiment of the filter system of the present invention, the filter cartridge is substantially free of metal. Metal present in filter cartridges can become a disposal problem when the filter cartridges are exposed to fluid containing radioactive or other contaminants. The disposal of such contaminated filter cartridges poses a problem because the metal, which requires special disposal, is attached to the filter media, which may not require special disposal. To avoid this problem, particularly preferred embodiments of the filter cartridge of the present invention have a metal-free core, as well as a filter cartridge substantially free of metal. Due to the relative size of the filter cartridge in relation to the conduit segments, the filter cartridge has been partially cut away in the Figures for clarity.

Figure 9:
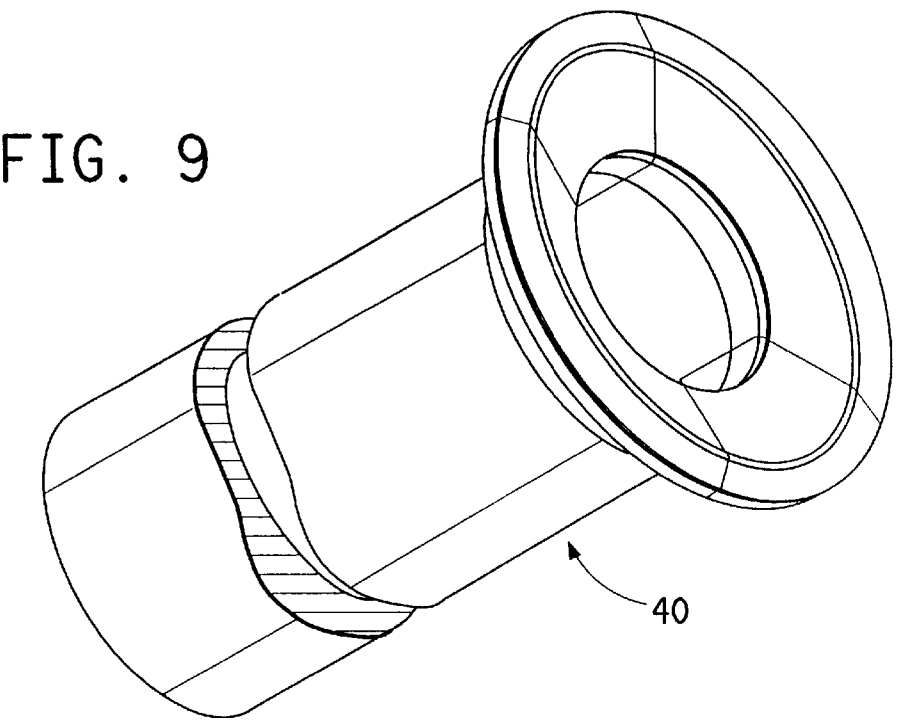
FIG. 9 is a perspective view of a latch/delatch tool of the present invention.
Figure 10:
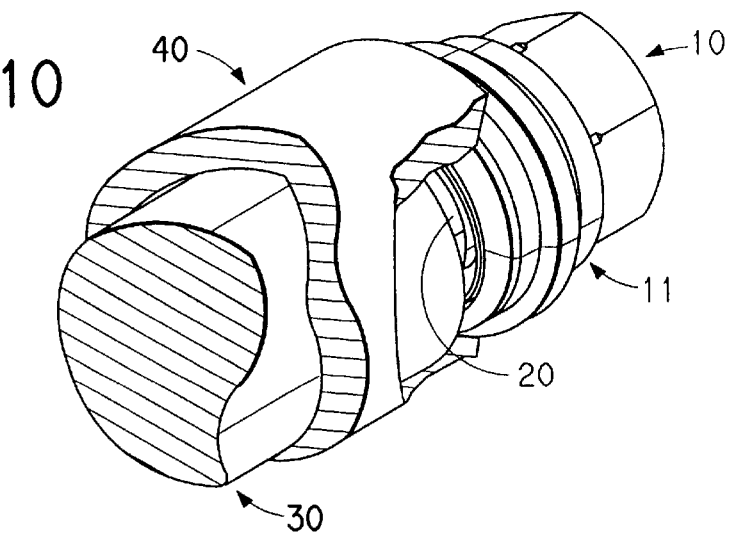
FIG. 10 is a perspective view of a first conduit segment mated to a second conduit segment with attached filter cartridge and a latch/delatch tool, the tool being partially cut away.

As shown in FIGS. 9, & 10, the filter system can further comprise a tool 40 adapted to move the collar from the extended position to the retracted position. The preferred embodiment of the tool, as shown in FIG. 9, comprises a hollow sleeve, open at both ends and adapted to fit over a filter cartridge and second segment, and further adapted to depress the collar of the first conduit segment into the retracted position. The collar preferably has a wider profile than the filter cartridge, and thus the tool can fit around the filter cartridge and contact the collar. The length of the tools is determined by the length of the filter cartridge used, and must be slightly less than the overall length of the filter cartridge when it is connected to the second conduit segment to allow the unconnected end of the filter cartridge to be grasped when the tool has depressed the collar. The tool can be fabricated from a wide variety of materials, and substantially rigid materials are preferred. Particularly preferred embodiments of the tool can be fabricated from metals such as aluminum.

The improved mechanism of the present invention, in its various possible embodiments, provides a particularly desirable combination of advantages. Specifically, the filter system of the present invention provides a means of quickly and easily removing and installing a filter cartridge in a purification system, thus reducing recurrent filter attachment hardware costs, and downtime due to reattachment of filters. The present invention provides a simpler design, allowing quicker installation. By providing a quicker means of installation, the exposure of operators to any harmful environmental conditions is reduced.

Furthermore, the design of the coupling collar provides a latch delatch component as well as a deflector of fluid. Specifically, the angular design of the collar reduces erosion of any treatment applied to the filter cartridge by redirecting the flow of fluid.

In addition, when the preferred latch/delatch tool is used, replacement of filter cartridges in a purification system is made more efficient, less costly, and less labor intensive by providing a means of mechanically changing filter cartridges. The resulting benefits from the present invention include increased reliability of individual filter systems within a purification system, as well as decreased down time of the power plant due to a reduction in the frequency of malfunction of the filter connections, as well as an increased ability to backwash the filters and thus renew their ability to purify fluid. The increased attachment reliability during backwashing allows for treating or coating the filter cartridge to remove particles, while preventing the treatment, typically a resin, from fouling the power plant. The increased reliability and quicker, more efficient replacement increases the efficiency of power generating plants, and reduces operational costs.

I claim:

1. In a cooling system adapted for use in a power generating plant, wherein said cooling system includes a filtering system, the improvement wherein the filter system comprises a housing containing a plurality of filter assemblies capable of filtering fluid flowing into or out of said housing, each filter assembly having a first conduit segment, a second conduit segment, and a filter cartridge, each segment having reciprocal mating ends and mating means adapted to connect the segments;

the first conduit segment having a connecting end and a female mating end, the connecting end adapted to connect to a conduit to convey fluid to or from the filter system, the female end further comprising mating means and a coupling collar assembly, the coupling collar assembly being movable at least between extended and retracted positions, the collar assembly adapted to expose the female mating end and open the mating means when in the retracted position, and to cover the female mating end and close the mating means when in the extended position;

the second conduit segment having a connecting end and a male mating end, the connecting end connecting to the filter cartridge, and the male mating end further comprising mating means;

wherein the male mating end is adapted to be inserted into the female mating end, thus connecting each conduit segment to form a single conduit, and the mating means of each segment are adapted to further connect each segment in the mated position, and wherein the collar assembly is adapted to secure the segments together when it is in the extended position, and wherein the segments can be separated when the collar assembly is in the retracted position.

2. A filter system of claim 1 further comprising a tool adapted to move the collar from the extended position to the retracted position.

3. A filter system of claim 2 wherein the tool is adapted to connect a filter cartridge and said second segment to said first segment, and to disconnect the filter cartridge and second segment from the first segment, the tool being adapted to push the collar assembly of the first segment into the retracted position, thereby exposing the female mating end of the first segment and opening the mating means of the first segment while the segments are united in the mated position, and securing the mated segments together by allowing the collar assembly to move to its extended position when the tool is pulled away.

4. A filter system of claim 2 wherein the tool is further adapted to remove a filter cartridge by pushing the collar into a retracted position, holding the collar in the retracted position while permitting the filter cartridge to be grasped and removed while the collar is in the retracted position.

5. A filter system of claim 1 wherein the filter cartridge is substantially free of metal.

6. A filter system of claim 1 wherein the female mating end of the first segment further comprises sealing means.

7. A filter system of claim 6 wherein the sealing means are gaskets.

8. A filter system of claim 1 wherein the first segment further comprises a middle section between the connecting end and the female mating end, the middle section having torsion receiving means.

9. A filter system of claim 8 wherein the torsion receiving means is located on an inner surface of the middle section of the first conduit segment.

10. A filter system of claim 9 wherein the torsion receiving means comprises planar segments which form a hexagonal middle conduit section adapted to accept insertion of a hexagonal wrench of appropriate size.

11. A filter system of claim 1 wherein the collar assembly comprises a coupling collar and a coupling collar spring, wherein the coupling collar is biased towards the extended position by the spring.

12. A filter system of claim 11 wherein the first segment has an upper restraining means and a lower restraining means, each restraining means positioned on opposing sides of the coupling collar.

13. A filter system of claim 12 wherein the upper restraining means is positioned to prevent the coupling collar from moving beyond the extended position, and the lower restraining means is positioned to prevent the coupling collar from moving beyond the retracted position, and wherein both restraining means retain the coupling collar and coupling collar spring.

14. A filter system of claim 12 wherein the upper restraining means comprises a retaining ring.

15. A filter system of claim 12 wherein the lower restraining means comprises a multiplicity of notches on the exterior surface of the first conduit segment.

16. A filter system of claim 5 wherein the filter cartridge has a core which is substantially free of metal.

* * * * *